3,047,108
AUTOMATIC LOCK FOR DEMOUNTABLE
STORAGE RACKS
Thomas N. D'Altrui, 495 S. 21st St., Irvington, N.J.
Filed Apr. 24, 1961, Ser. No. 113,583
9 Claims. (Cl. 189—36)

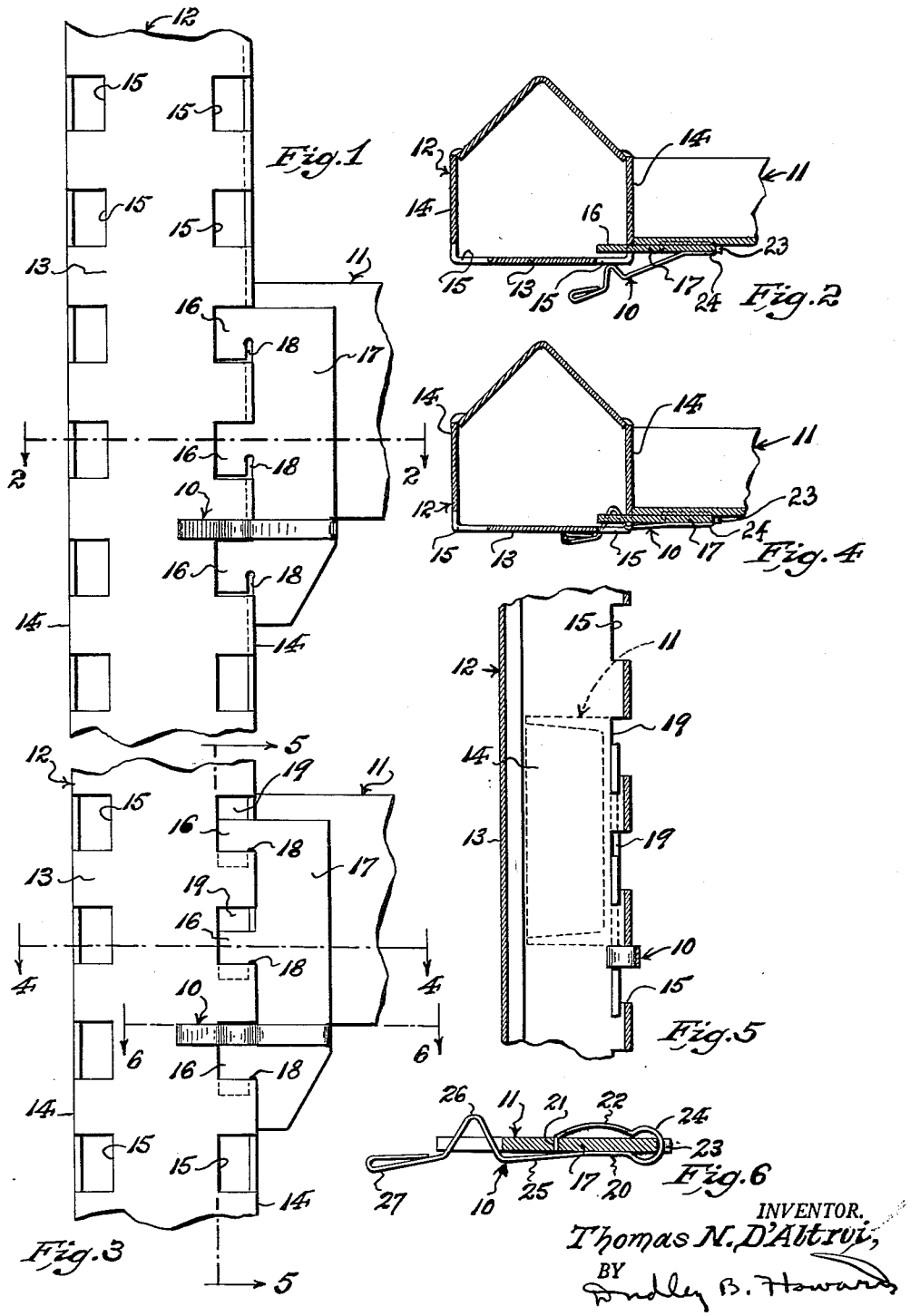

The invention relates in general to demountable storage racks such as are used in warehouses and stockrooms to support vertical tiers of pallets, shelving or other loads, and has particular reference to locking devices for interengagement with the upright frames and load-supporting stringers or brackets erected thereon to insure against accidental dislodgment from the engaged frames of the load-supporting members, as when the operator of a fork lift truck carelessly raises a pallet or other load so high that it exerts upthrust on an overlying stringer or bracket.

In prior Patent No. 2,895,619 issued July 21, 1959, and which I now control, there is disclosed a so-called "wedge lock" device to prevent accidental dislodgment of the ends of an erected load-supporting horizontal stringer from the engaged posts of adjacent upright frames between which it extends. Also, in my later Patent No. 2,971,658, issued February 14, 1961, a similar "wedge lock" device is disclosed to prevent accidental dislodgment of a short horizontal load-supporting bracket from the post which constitutes its sole support. In both of these prior art storage racks, the stringer and bracket arm are equivalent load-supporting members and it happens that the wedge lock devices disclosed in both patents can be used with either storage rack embodiment. However, these similar wedge lock devices were designed for manufacture by casting process and consequently are so bulky that an objectionably large space must be reserved for their insertion in the post entrance slots with which connector tongues of the cooperative load-supporting members are engaged. As a result, the degree of vertical adjustment in position of any erected load-supporting member is greater than would be practicable if the reserved wedge lock insertion space were reduced in vertical extent so that a greater number of more closely spaced entrance slots could be accommodated by the length of each upright frame post without sacrificing vertical compression strength adequate for support of all expected loads.

It, therefore, is the primary object of my present invention to provide an improved wedge lock device that occupies greatly reduced vertical slot space and yet, due to its unique construction, is capable of withstanding all vertical compression stresses to which it may be subjected in use.

To be more explicit, whereas the cited prior art wedge lock devices were comparatively thick block-like like cast structures, my improved wedge lock device is formed from a narrow strip of spring steel, or the like, which in its applied position stands on edge and has a horizontally bent wedge-shaped detent capable of withstanding without failure the greatest compression stresses likely to be imposed in practice.

In the cited prior art storage racks, wedge lock devices had to be inserted carefully and in a tedious manner in the tongue-engaged post entrance slots following erection of each supported stringer or bracket arm. Moreover, forgetful failure to apply one or more of the required wedge lock devices could result in disastrous dislodgment and collapse of a load-supporting stringer or bracket arm. It, therefore, is another object of my invention to provide an improved automatically locking wedge lock device capable of detachable installation on each connector plate of a desired number of load-supporting stringers or bracket arms. The construction of the new locking device is such that it snaps automatically into locking position without being touched manually when the corresponding connector tongue of the load-supporting member has become completely settled in its engagement with a post entrance slot. The locking device, however, will adhere to its operative locking position until deliberately shifted manually into unlocked position for the purpose of demounting the load-supporting member from the upright frame post.

Further objects, advantages and desirable features of the invention will become apparent as the following specific description is read in connection with the accompanying drawing, in which:

FIG. 1 is a fragmentary front elevational view of an upright frame post, showing a load-supporting member while being held manually in the initial position of assembly in which the connector tongues are horizontally moved into the selected post entrance slots, the locking detent of the locking device being in contact with the front face of the post and flexed outwardly into tensioned inoperative position immediately above the momentarily blocked upper portion of the slot;

FIG. 2 is a horizontal section taken on line 2—2 of FIG. 1;

FIG. 3 is a view similar to FIG. 1, showing the load-supporting member after being lowered to bring the anchor slot of each connector tongue thereof into embracing engagement with the lower edge of the correspondingly located post entrance slot, the locking detent of the locking device being shown in relaxed operative position in engagement within the now unmasked gap at the upper end of the post entrance slot;

FIG. 4 is a horizontal section taken on line 4—4 of FIG. 3; and

FIG. 5 is a vertical section on line 5—5 of FIG. 3.

FIG. 6 is a horizontal sectional view of a modified form of locking device.

Referring now in detail to the drawing, wherein like reference characters designate corresponding parts in the several views, my invention resides primarily in the locking device 10 which serves to lock the load-supporting member 11 of a storage rack of the general construction disclosed in previously cited Patents Nos. 2,895,619 and 2,971,658 to one of the upright frame posts 12 thereof in a manner to prevent accidental dislodgment from assembled relation.

Each frame post 12, whether it be of the C-shaped cross-section shown in Patent No. 2,895,619, completely tubular as in Patent No. 2,971,658, or of any other cross-sectional form, must have a cross wall 13 and at least one side wall 14 integrally merging with said cross wall substantially at right angles although in an equivalent arrangement the walls may be at slightly acute or obtuse angles one to the other.

It will be understood that each post 12 is one of a pair that stand at the front and rear of an upright frame, which includes truss members (not shown) to connect and suitably space the said posts.

In order that laterally aligned storage rack units may be erected on opposite sides of any upright frame, it is practically expedient to have two side walls 14 in integrally merging relation to cross wall 13. Consequently, both front corners of each post 12 are cut away at vertical intervals to provide vertically uniformly spaced pairs of side-by-side substantially rectangular entrance slots 15 of equal dimensions. These entrance slots 15 are engageable by similarly vertically spaced and flat connector tongues 16 formed on the vertically flat connector plate 17 united rigidly, as by welding, to each load-supporting member 11. If load-supporting member 11 is an elongated stringer, there will be a connector plate 17 at each end. If, on the other hand, load-supporting member 11 is a short bracket, there will be a connector plate at its base end only. In the accompanying drawing, the connector plate 17 for load-supporting member 11 is shown as having three equally vertically spaced connector tongues 16 for engagement with three adjacent post entrance slots 15, but it is to be understood that there may be one or more connector tongues 16 on each connector plate 17, the number being optional. Of course, the more connector tongues that there are in a set, the greater will be the strength and rigidity of the post connection. It should now be understood why the greater number of smaller and more closely vertically spaced entrance slots 15 in the present improved post structure affords greatly increased compression strength over that inherent in the structure disclosed in the prior patents cited earlier herein, the other advantage being the possibility of making vertical adjustment of load-supporting members in smaller degrees of adjustment than heretofore.

As in the cited prior art disclosures, each connector tongue 16 of load-supporting member 11 is slightly less (for operational clearance) in length than the horizontal width of the cross wall portion of entrance slot 15, slightly less in vertical width than the height of said slot, and slightly less in horizontal thickness than the horizontal depth of the side wall portion of said slot, whereby the connector tongue may be introduced directly into the entrance slot by horizontal movement in a front to rear direction until it overlies the lower edge of the side wall portion of said slot. Each connector tongue 16 has a vertical anchor slot 18 in its lower edge for embracing engagement with the lower edge of the side wall portion of an engaged post entrance slot after the load-supporting member 11 has been lowered from the initial assembly position represented in FIG. 1 to the final position shown in FIG. 3.

It will be observed in FIG. 3 in particular that, when the connector tongues 16 of each load-supporting member 11 are in their final post entrance slot engaging positions, there will be gaps 19 between the upper edges of the respective post entrance slots 15 and the upper edges of the slot-engaged connector tongues. These gaps are reserved for insertion of locking detents, to be described presently, forming parts of locking devices 10.

Each locking device 10 is formed from an elongated strip, or blank, of resilient material, such as spring steel, plastic, or other suitable material, which is slightly narrower than the vertical dimension of each gap 19 in the tongue-engaged post entrance slots 15, and includes a base portion 20 in the form of a substantially rectangular open clasp that is adapted to embrace the inner edge portion of the connector plate 17 of a load-supporting member 11. For secure attachment of base portion 20 to connector plate 17, the free inbent end of rear portion 22 of the strip from which locking device 10 with its open clasp portion is made constitutes an attaching detent engageable with a vertical slit 21 provided in said connector plate in a position at a slightly higher level than the upper edge of a selected connector tongue 16 (the lower one of the set of three in the accompanying drawing). To stabilize the connection of base portion 20 in assembled position so that the locking device as a whole cannot wobble about a horizontal axis, a stabilizing notch 23 is provided in the inner edge of connector plate 17 for engagement by the bight portion 24 of base, or clasp, portion 20 of locking device 10.

A flexible shank portion 25 extends from base portion 20 toward the selected connector tongue 16 of the load-supporting member 11 on which the locking device 10 is assembled and is bent rearwardly to form a wedge-shaped locking detent 26 for engagement within one of the gaps 19 in the final assembled position of the load-supporting member 11 illustrated in FIGS. 3 and 4. A manipulating loop 27 is formed on the free end of the strip, or blank, adjacent to locking detent 26.

FIG. 6 shows a modified form of locking device 10 in which the rear portion 22 of base, or clasp, portion 20 is outwardly bowed to permit insertion of an unlatching tool (not shown), such as a screwdriver, to facilitate disengagement of the attaching detent from slit 21 in connector tongue 16. Another change is enlargement of the bight portion 24 of base portion 20 to a curved shape of large radius in order to withstand repeated flexion without structural failure.

As previously explained, locking devices 10 may be assembled in the manner just described with any number of load-supporting members in readiness for automatic locking engagement of their locking detents 26 with appropriate gaps 19 in the post entrance slots 15 of upright frame posts 12 when erecting desired storage rack units.

The operation of the device will now be described.

First, there is assembly of each locking device 10 on one of the load-supporting members 11. This is accomplished by manually spreading base portion, or clasp, 20 of locking device 10 and embracingly engaging it with the inner edge portion of connector plate 17 of load-supporting member 11 in the assembled relation shown on an enlarged scale in FIG. 6. In this position, the attaching detent at the free end of the base portion, or clasp 20 will be engaged in slit 21 and bight 24 will be engaged in stabilizing notch 23. Consequently, flexible shank portion 25 and locking detent 26 will be limited to swinging movement on a vertical hinge axis between the tensioned position shown in FIG. 2 and the relaxed position shown in FIGS. 4 and 6.

With a locking device 10 installed on a load-supporting member 11, erection of the said member on an upright frame post 12 is performed without any manipulation of the locking device, because its action is automatic. All that is necessary is to hold the load-supporting member in level position at the desired height and insert the connector tongues 16 by horizontal movement alone (usually directly from front to rear in the case of a front frame post) into the initial position represented in FIG. 1. In this position of load-supporting member 11, locking detent 26 will have been deflected horizontally outward by contact with cross wall 13 of post 12 into the inoperative position shown in FIGS. 1 and 2. Then, when connector tongues 16 are lowered into the position shown in FIGS. 3 and 4, locking detent 26 will snap into the related post entrance slot gap 19.

It should be apparent that locking detent 26, which rests edgewise on the upper edge of its related connector tongue 16, is of such re-entrant wedge shape that it affords strong resistance to vertical compression stresses, such as can be exerted by excessive upthrusts on load-supporting member 11 by a carelessly operated fork lift truck. However, it is to be understood that an equivalent construction would be to have a solid detent of triangular or otherwise inwardly tapered form, or even rectangular or circular form. When using plastic material in fabrication of the locking device, it may be desirable to mold the entire structure, so a solid detent will be practicable.

While the invention has been illustrated and described with respect to only two embodiments thereof, it will be understood that it is intended to cover all changes and modifications of the embodiments shown which do not constitute departures from the spirit of the invention and scope of the appended claims.

I claim:

1. In a storage rack, the combination of an upright post including a cross wall and at least one side wall merging in a substantially right-angled corner, portions of said corner being cut away at vertical intervals to provide entrance slots each of which opens through both the cross wall and the side wall, a horizontally elongated load-supporting member including a flat connector plate lying in a vertical plane and having at least one connector tongue projecting longitudinally outward for demountable engagement within a selected entrance slot of the upright post and being slightly less in length than the horizontal width of the cross wall portion of each entrance slot, slightly less in vertical width than the height of said slot, and slightly less in horizontal thickness than the horizontal depth of the side wall portion of said slot, whereby the connector tongue of the connector plate may be introduced directly by horizontal movement in a front to rear direction into the engaged entrance slot through the cross wall portion thereof until it overlies the lower edge of the side wall portion of said slot, the connector tongue being provided with a vertical anchor slot in its lower edge to embrace the lower edge of the side wall portion of the engaged entrance slot, the vertical extent of the anchor slot in the connector tongue being such that a detent-receiving gap is created between the upper edge of the cross wall portion of each entrance slot and the upper edge of a connector tongue when engaged with said slot with its anchoring slot embracing the lower edge of the side wall portion of the entrance slot, and an automatic locking device removably attached to the connector plate of the load-supporting member to prevent dislodgment of the connector tongue of said connector plate from post entrance slot engagement when the load-supporting member is accidently thrust upwardly, said locking device comprising a base portion, means to attach said base portion rigidly to the connector plate of the load-supporting member, a resilient shank portion extending horizontally from said base portion in the same direction as the connector tongue and located directly above the level of the upper edge of said tongue, and a detent portion provided on the free end of said shank portion and facing horizontally rearward for locking engagement with the detent-receiving gap when the connector tongue of the load-supporting member becomes completely engaged with the post entrance slot.

2. The invention defined in claim 1, wherein the detent portion of the locking device is constructed and arranged to bear against the cross wall of the upright post above the entrance slot during initial horizontal movement of the connector tongue of the load-supporting member into said slot with the shank portion of said device outwardly horizontally flexed and adapted to swing automatically into the detent-receiving gap when said connector tongue subsequently is lowered into embracing engagement of its downwardly facing anchor slot with the lower edge of the post entrance slot.

3. The invention defined in claim 2, to which is added a manipulating portion provided on the detent portion.

4. The invention defined in claim 1, wherein the locking device is made from a strip of vertically flat material, whereby vertical pressure resisting strength of said device is achieved for minimum height to reduce the vertical extent of the detent-receiving gap.

5. The invention defined in claim 1, wherein the locking device is made of a vertically flat strip of resilient material, and wherein the base portion thereof is in the shape of a substantially rectangular open clasp embracing the connector plate of the load-supporting member.

6. The invention defined in claim 5, wherein the clasp-form base portion of the locking device has an inbent attaching detent at the free end of the strip, and wherein the connector plate of the load-supporting member has a vertical slit for engagement by the said attaching detent.

7. The invention defined in claim 6, wherein the connector plate of the load-supporting member has a stabilize notch in its inner edge, and wherein the base portion of the locking device has a stabilizing bight engaged with said stabilizing notch.

8. The invention defined in claim 7, wherein the rear wall of the base portion of the locking device is outwardly bowed to provide for flexing reception of an unlatching tool.

9. The invention defined in claim 1, wherein the entire locking member is made from a vertically flat strip of resilient material, and wherein the detent portion is angularly bent into reentrant wedge-shape to increase the vertical strength.

References Cited in the file of this patent

UNITED STATES PATENTS

| | | |
|---|---|---|
| 1,662,729 | Wait | Mar. 13, 1928 |
| 2,152,603 | Pender | Mar. 28, 1939 |
| 2,776,030 | Bush | Jan. 1, 1957 |
| 2,911,693 | McMullen | Nov. 10, 1959 |